INVENTOR
NORMAN B. NEWTON
BY Harris G. Luther
ATTORNEY

United States Patent Office 2,973,745
Patented Mar. 7, 1961

2,973,745

CONTROL VALVE AND ACTUATING MEANS

Norman B. Newton, Glastonbury, Conn., assignor to United Aircraft Corporation, East Hartford, Conn., a corporation of Delaware Filed Oct. 5, 1959, Ser. No. 844,558

9 Claims. (Cl. 121—42)

This invention relates to control mechanism and particularly to hydraulic control mechanism and more particularly to hydraulic control mechanism subject to changing viscosity of the hydraulic fluid for the control.

An object of the invention is mechanism which reduces the adverse effects of congealed hydraulic fluid on the operation of the control.

A further object is a valve actuated by differential pressure which valve, upon slight movement, becomes an absolute pressure valve.

A still further object is mechanism for applying to a valve a closing pressure opposing an opening pressure and upon slight valve movement removing the closing pressure.

A still further object is pressure actuated mechanism to which a closing force is applied by a working pressure on one side and which has a bleed to the opposite side of the mechanism which may cause an opening force to be applied by said working pressure due to congealing of the pressure medium on said other side and in which the closing force is removing by slight movement of the mechanism caused by a pressure on the opposite side materially greater than said working pressure.

Other and additional objects will be apparent from the following specification and the accompanying drawings in which.

Figure 1:
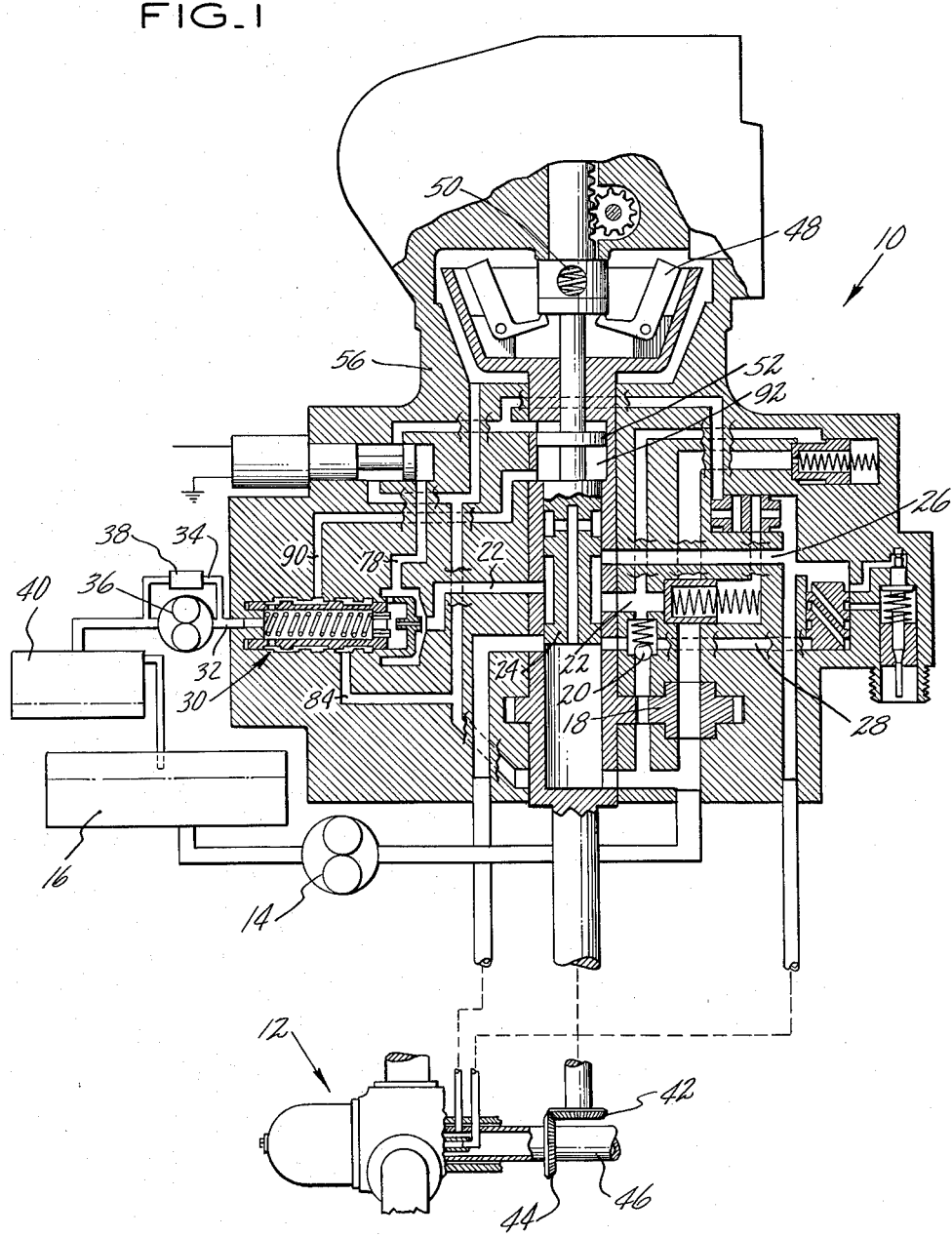
Fig. 1 is a vertical cross section, partially schematic, of a propeller governor incorporating the invention.

In the control of hydraulically actuated aerodynamic propellers utilizing engine oil or other oil supply for normal operation and using a separate supply energized by an auxiliary pump and a separate oil line, it has been customary to feed the primary or engine oil, which is heated incident to normal operation, through a bleed orifice, through the auxiliary line, around the auxiliary pump, and back to the auxiliary fluid reservoir, which may be the same reservoir as the engine supply, in order to keep the oil in the auxiliary line warm and prevent it from congealing. It has been found that even with these precautions, the oil in the auxiliary line will sometimes congeal, causing the pressure in the auxiliary line to rise, and give the same effect as operation of the auxiliary pump, which may operate the feathering valve and cause the propeller to inadvertently start into feathered position. The present invention is an improvement upon the previous mechanism, which will prevent the congealing of oil in the auxiliary feedline from having this adverse effect. This is done by making the pressure actuated valve, which is responsive to auxiliary pressure, a differential valve and applying the normal operating pressure to the differential area on the outside of the sleeve valve. The auxiliary pressure, or the pressure built up by congealing of the auxiliary line, is applied to the differential area on the opposite ends of the sleeve valve so as to balance the valve except when auxiliary pressure higher than the normal operative pressure is applied to the differential area on the ends of the sleeve valve.

The mechanism used to illustrate the present invention is a governor control for a hydraulically actuated propeller having a governor indicated generally at 10 and a propeller indicated generally at 12. The governor propeller mechanism is similar to the mechanism described in Martin et al. Patent No. 2,643,077, to which reference may be made for many of the governor and propeller details. Only sufficient part of the mechanism will be described here to provide an understanding of the construction and operation of the mechanism involving the present invention. In the device shown, oil or other hydraulic fluid is supplied by the pump 14 which is continuously running during operation of the propeller governor mechanism and draws oil from a reservoir 16 and supplies it to a governor, or booster, pump 18 which in turn supplies pressure oil through check valve 20 to pressure line 22 and governor pilot valve 24. The governor pilot valve 24 selectively distributes this pressure oil to high pitch line 26 and low pitch line 28 in the usual manner to control the pitch of the propeller. Line 22 introduces this governor oil to a valve indicated generally at 30 from where it is normally distributed through a bleed connection, to be described later, through an auxiliary oil supply line 32 and through a bypass 34 around the auxiliary pump 36, including a pressure actuated backflow valve 38, to the auxiliary reservoir 40. This governor oil is fed backwards through this auxiliary supply line 32 in order to keep the oil in that supply line warm and prevent it from congealing. The governor which is continuously driven through beveled gears 42 and 44 from the propeller shaft 46, comprises centrifugally actuated flyweights 48 working against the usual speeder spring 50. In the position shown in Fig. 1, the flyweights are in an overspeed position, or the governor pilot valve has been forced to its feathering position, so that the governor pressure oil is fed from the line 22 to high pitch line 26.

Figure 2:
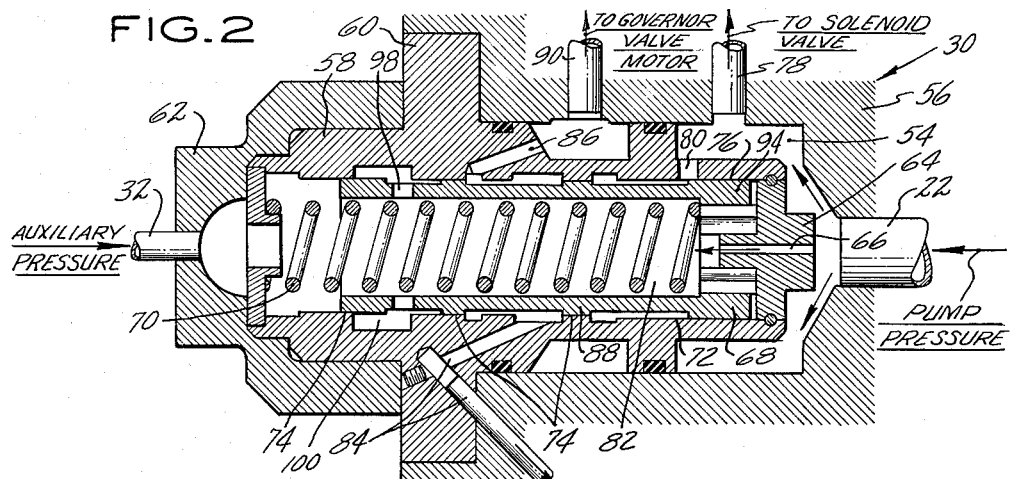
Fig. 2 is a longitudinal sectional view of a valve incorporating the invention and shown in its closed differential pressure position.
Figure 3:
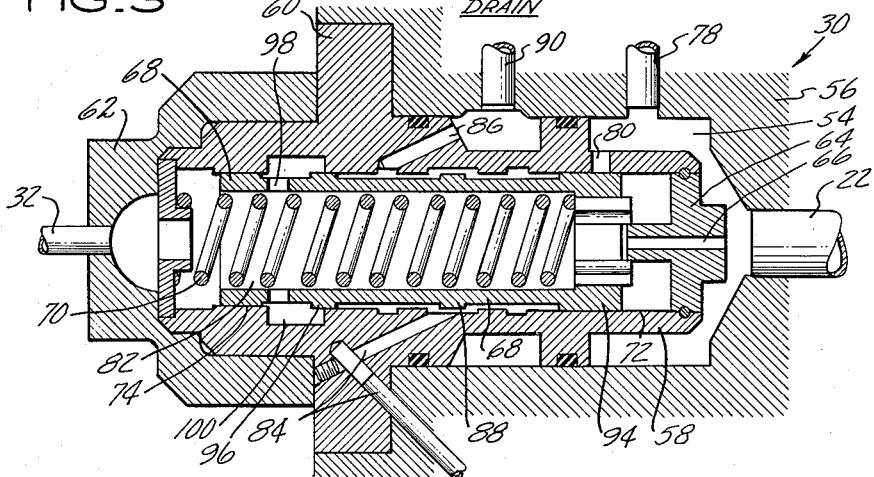
Fig. 3 is a longitudinal sectional view of the valve in its moved position as an absolute pressure valve.
Figure 4:
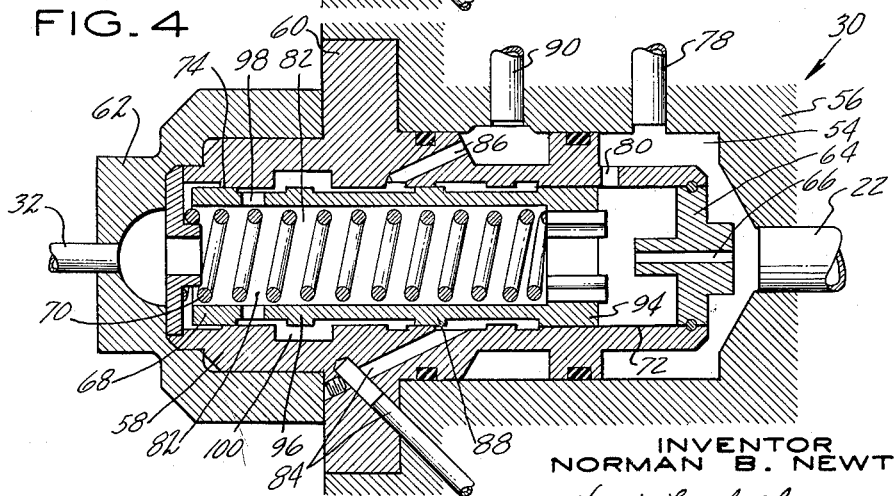
Fig. 4 is a longitudinal sectional view of the valve in its open position.

The valve 30 which is shown in more detail in Figs. 2, 3 and 4, is used to direct auxiliary pressure fluid to the underside of a piston 52 secured to the pilot valve to force the pilot valve upward into the position shown in Fig. 1. As shown in Fig. 2, governor pressure oil is fed from line 22 to chamber 54 in the governor body 56. A cylinder 58 is held in the governor body by a flange 60 which may be clamped therein by any suitable means, such as bolts or cap screws, not shown. A cap 62 fits over one end of cylinder 58 and acts as a closure for that end and a plug 64 is fitted into the opposite end of cylinder 58 and forms a closure for that end. A bleed passage 66 passes through closure 64 and connects the inside of cylinder 58 with chamber 54 on the outside thereof.

A piston 68 in the form of a sleeve is fitted inside of cylinder 58 and is forced toward the closure 64 by a spring 70. The cylinder 58 has a two-diameter bore forming a stepped cylinder with the larger bore indicated at 72 and the smaller bore indicated at 74. The sleeve piston has corresponding stepped diameters forming a differential area piston with the larger diameter at 76 and the smaller diameter at 74. The sleeve piston therefore presents a differential area between the diameter 76 and 74 on the outside of the piston and a similar differential area at the ends of the piston.

As indicated above, governor pump pressure is fed through line 22 to the chamber 54 and passes out through pipe 78 to a control valve which may be a decrease pitch valve forming no part of the present invention. This same oil continually passes through the bleed or restricted passage 66 and out through line 32 to the auxiliary pump and then bypasses around that pump. A port or passage 80 is provided in cylinder 58 in the large diameter section so as to lead to the differential area on the outside of the piston when the piston is in its extreme position adjacent the closure 64. This port 80 will lead the pump pressure to the differential area on the piston. The bleed 66 will lead the pump pressure to the differential area on the ends of the piston, in the event auxiliary pressure line 32 is blocked by congealed oil, so that no motion will be imparted to the piston. It should be noted that by making the valve piston 68 in the form of a sleeve with the passage 82 connecting the opposite ends, the fluid pressure applied through the bleed 66 or through the auxiliary pressure line 32 is applied to the opposite ends of the piston.

A drain passage or port 84 is provided in the cylinder 58 in the small diameter portion thereof and an outlet passage or port 86 is also provided in the cylinder 58 connecting with the small diameter portion. A land 88 on the piston 68 coacts with the small diameter of the cylinder and isolates passages 86 and 84 from passage 80 with the piston in the position shown in Fig. 2.

As indicated above, introduction of auxiliary pressure, through the line 32, higher than the pump pressure being applied through port 80, will move piston 68 against the action of spring 70 and governor pressure acting on the outside differential area of the piston and sufficient auxiliary pressure will move the piston to the position shown in Fig. 3. In the Fig. 3 position, land 88 has moved into a recess in the small diameter portion of cylinder 58 so as to connect the differential area on the outside of piston 68 with drain. Ports 84 and 86, are however, connected together with the piston in the position shown in Fig. 2 and in Fig. 3. Port or passage 86 connects with pipe 90 which, as shown in Fig. 1, leads to the area 92 under the piston 52 formed on the governor pilot valve 24 so that in the position shown in Figs. 2 and 3, that is, with a medium amount of auxiliary pressure, the area 92 is continuously connected with drain and the governor pilot valve is not affected.

Movement of the piston 68 to the position shown in Fig. 3 will cause land 94 to block the passage 80 and thus remove the governor pressure from the differential area on the outside of the piston 68. The piston thus becomes a single-acting rather than a double-acting piston with pressure effectively applied to only one end and in one direction. The auxiliary pressure may then be increased to a fixed amount to move the valve a predetermined distance irrespective of the governor pump pressure which now has no effect upon the piston. This further increased auxiliary pressure will move the piston 68 to the extreme position adjacent the closure member 62 and the land 88 will again cooperate with the reduced diameter of the cylinder and isolate drain passage 84 from passage or port 86. Land 96 which has previously been cooperating with the smaller cylinder diameter to isolate port 98 in piston 68 from port 86 in the cylinder 58, will now have moved, as shown in Fig. 4, away from its cooperating position and into recess 100 in the cylinder so that port 98 will now be connected through recessed portions in the exterior of piston 68 and in the cylinder 58 with the outlet passage or port 86 and thus with the pipe 90. In the position shown in Fig. 4, the piston 68 which thus acts as a valve will now direct auxiliary pressure fluid from the line 32 through port 98 and passage 86 to pipe 90 and hence to the area 92 under the piston 52 on the governor pilot valve and move the governor pilot valve to the position shown in Fig. 1 where the oil being delivered from the governor pump through line 22 and oil being delivered through auxiliary pump passage 32, will both be fed into the line 90. As shown in Fig. 4, positioning the sleeve 68 to the extreme position adjacent the closure member 62 will open port 80 to the interior of the cylinder 58 at one end of the piston because the land 94 will no longer block passage 80 and hence governor oil will be led to the interior of the piston sleeve to mix with auxiliary oil.

It will be seen that I have provided a mechanism in which the governor pump pressure will have no effect on the positioning of the piston valve 68 even if the auxiliary line 32 is blocked but in which the auxiliary pressure introduced through the line 32 may position the piston valve 68 independent of the governor oil pressure in connecting the auxiliary pressure with the pipe 90. Stated another way. I have provided a differential area piston valve and means for connecting that piston valve as a double-acting piston valve, i.e., with opposing pressures on opposite sides of the piston in one position and as a single-acting or absolute pressure piston valve in another position, the piston valve automatically changing from double-acting to single-acting in operation.

It is to be understood that the invention is not limited to the specific description above or to the specific figures, but may be used in other ways without departure from its spirit as defined by the following claims.

I claim:

1. A hydraulic motor, having opposite sides, means for applying a first hydraulic pressure to one side urging the motor in one direction, means for applying a second greater hydraulic pressure to the other side opposing said first pressure and urging the motor in the other direction, a bleed connecting said opposite sides for circulating fluid from one side to the other, and means operable by movement of said motor blocking the application of said first pressure to said one side of said motor and venting said one side.

2. In combination with a motor, a continuously applied first source of pressure fluid, an auxiliary normally inoperative second source of pressure fluid, means for directing fluid from said second source to one side of said motor for operating said motor, and a bleed connecting said sources to circulate fluid from said first to said second source, said inoperative second pressure source normally providing a connection from said one side of said motor to drain but subject to obstruction, means preventing actuation of said motor by pressure through said bleed from said first source when said second pressure source is obstructed, comprising means directing fluid from said first pressure source to the side of said motor opposite to the side connected to said second pressure source, and means operable by movement of said motor by fluid from said second pressure source to block the application of fluid from said first pressure source to said opposite side.

3. In combination with a valve controlling auxiliary fluid, a motor connected with said valve and actuated by said fluid for opening said valve, means connecting said auxiliary fluid with one side of said motor, a second source of fluid and a bleed connection from said second source to said connecting means for circulating fluid from said second source through said connecting means, means preventing actuation of said motor to open said valve by fluid from said second source comprising means conducting fluid from said second source to the other side of said motor, and means, actuated by movement of said motor by said auxiliary fluid, blocking said conducting means and connecting said other side with drain.

4. A combination as claimed in claim 3 including a spring urging said valve and motor in the valve closing direction having a spring rate such that materially greater auxiliary pressure is required to open said valve than to actuate said blocking means.

5. A combination as claimed in claim 3 including means opening a passage from said second source to said connecting means in parallel with said bleed passage upon opening of said valve.

6. In combination, a first source of fluid, a governor having means for distributing said fluid, a motor for disabling said governor and positioning said means, a second source of fluid, means directing fluid from said second source to said motor, including a valve and means, actuated by fluid from said second source, for opening said valve, a bleed connection between said first source and said second source and said opening means for continuously circulating fluid from said first source through said directing means toward said second source, means conducting fluid from said first source to one side of said opening means and urging said valve to closed position and means operable by movement of said opening means in an opening direction blocking fluid from said first source from said one side of said opening means, and means actuated simultaneously with opening of said valve connecting said first and second sources in parallel with said bleed.

7. A combined valve and actuating motor comprising a movable piston having axially spaced portions of different diameters slidable in a mating cylinder having axially spaced portions of correspondingly different diameters, a passage connecting opposite ends of said piston, means introducing auxiliary pressure inside said cylinder to the ends of said piston, means including a first port in said cylinder introducing fluid from a second source to said piston between said spaced portions, and a bleed connecting said second source with said piston ends, second and third ports in said cylinder spaced from said first port, said second port connected with drain and said third port connected to a device to be actuated, lands on said piston cooperating with said ports to block said first port and connect said second port to said piston between said spaced portions upon initial movement of said piston and connect said piston ends with said first and third ports on further movement of said piston.

8. A combined valve and motor as claimed in claim 7 in which said third port is connected by said piston and lands with said second port except on said further movement of said piston.

9. A combined valve and actuating motor comprising a movable sleeve having axially spaced external portions of different diameters, means introducing auxiliary pressure inside said cylinder to the ends of said sleeve, a first port in said cylinder introducing fluid from a second source to said sleeve between said suaced portions, a bleed connecting said second source with said introducing means, a drain port and an outlet port in said cylinder spaced from said first port, and normally connected by said valve, initial movement of said valve by said auxiliary pressure blocking said first port and connecting said drain port to said sleeve between said spaced portions, and further movement of said valve by said auxiliary pressure blocking the connection between said drain and outlet ports and connecting said outlet port with said introducing means and said first port.

References Cited in the file of this patent

UNITED STATES PATENTS

| | | |
|---|---|---|
| 2,398,713 | Martin | Apr. 16, 1946 |
| 2,733,690 | Adler | Feb. 7, 1956 |
| 2,738,650 | McAfee | Mar. 20, 1956 |

FOREIGN PATENTS

| | | |
|---|---|---|
| 69,525 | France | Nov. 10, 1958 |
| | (1st addition to 1,125,052) | |